March 3, 1959　　A. J. INGOLIA ET AL　　2,876,037
VEHICLE BODY SHELL

Filed Jan. 17, 1955　　2 Sheets-Sheet 1

INVENTORS.
Anthony J. Ingolia &
BY Robert F. McLean
Paul Fitzpatrick
ATTORNEY

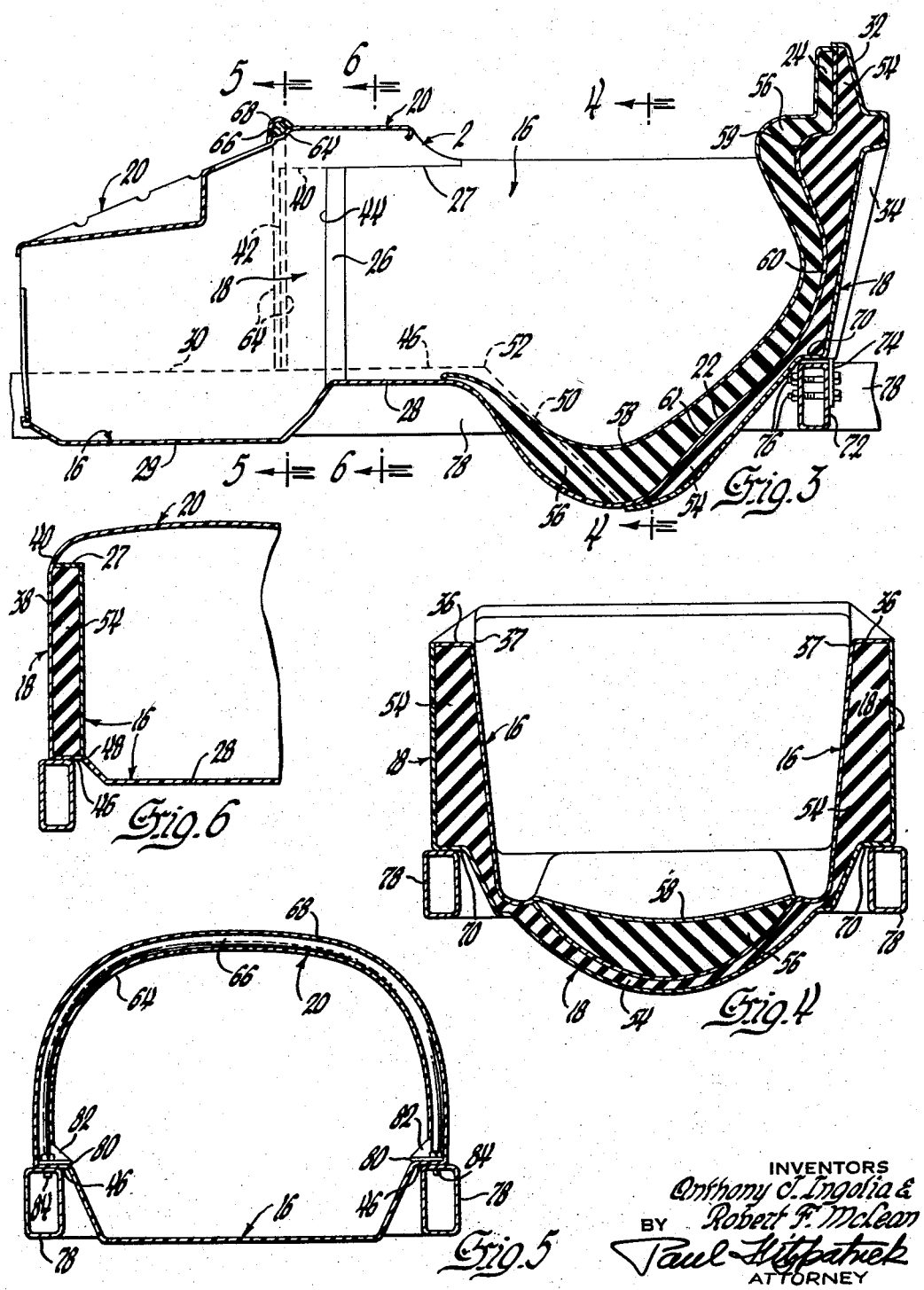

United States Patent Office 2,876,037
Patented Mar. 3, 1959

2,876,037

VEHICLE BODY SHELL

Anthony J. Ingolia, Detroit, and Robert F. McLean, Oak Park, Mich., assignors to General Motors Corporation, Detroit, Mich., a corporation of Delaware Application January 17, 1955, Serial No. 482,091

4 Claims. (Cl. 296—28)

This invention relates to a body shell and more particularly to a body shell or cockpit for a vehicle or the like.

In the preferred embodiment of this invention, the cockpit is formed of rigid unitary shells of plastic and glass cloth laminate. A first shell defines the lower forward outer portion and the inner side and inner rear portions of the cockpit, a second shell defines the rear outer portion and the outer side portions of the cockpit, and a third shell defines the upper forward outer portion of the cockpit. The shells are bonded together at their edges, with the first and second shells being spaced apart so that part of the cockpit is of double wall construction. The chamber so formed is filled with cast-in-place rigid phenolic foam for reinforcement. The double wall reinforced construction provides maximum protection for the driver or operator and the cockpit is virtually indestructible. Strengthening ribs in the rear outer portion of the cockpit provide additional reinforcement.

The rear inner portion of the first shell is contoured to the body of the driver or operator and accommodates him in a semi-reclining position. A layer of foam rubber covering the contoured portion of the shell provides seating comfort. The first and second shells have spaced head rest portions, with the space between the portions filled with the phenolic foam reinforcement. The head rest portion of the first shell is a continuation of the contoured portion and is covered with the layer of foam rubber. The forward portion of the cockpit provides space for the control mechanism of the vehicle or the like and for the feet of the driver or operator. Since the position of the seat is fixed, the control mechanism may be adjustable. A rigid metal bar encased within the second and third shells at the forward portion of the cockpit provides additional strengthening. The cockpit is of exceedingly strong construction and of very light weight. The driver or operator is isolated from the noise and heat of the power plant and is afforded maximum visibility and maximum protection since the cockpit extends above his shoulders.

An object of this invention is to provide a body shell or cockpit for a vehicle or the like affording maximum protection to the driver or operator. Another object of this invention is to provide a body shell or cockpit for a vehicle or the like affording maximum protection and visibility to the driver or operator and virtually indestructible.

These and other objects of this invention will be readily apparent from the following specification and drawings, in which:

Figure 3 is a sectional view on the plane indicated by line 3—3 of Figure 2;

Figure 4 is a sectional view on the plane indicated by line 4—4 of Figure 3;

Figure 5 is a sectional view on the plane indicated by line 5—5 of Figure 3; and Figure 6 is a fragmentary sectional view on the plane indicated by line 6—6 of Figure 3.

Figure 1:
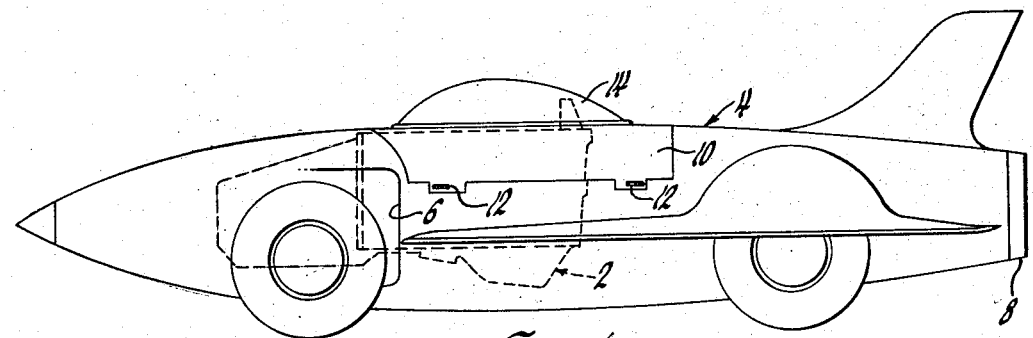
Figure 1 is a view of a gas turbine powered vehicle having the body shell or cockpit of this invention mounted therein.

Referring now to Figure 1 of the drawings, the body shell or cockpit 2 of this invention is shown mounted in a gas turbine powered vehicle 4. Air for the power plant enters through openings 6 on either side of the vehicle and the exhaust from the turbine discharges through tail cone 8. The power plant is located to the rear of the cockpit and the driver or operator would be subject to heat and noise were it not for the excellent insulating and acoustical properties of the cockpit.

The cockpit is mounted directly on the chassis frame and adds additional rigidity to the frame because of its exceedingly strong construction. The outer body or shell of the vehicle is formed of detachable panels directly supported by the vehicle chassis and enclosing the cockpit. One panel 10 is removably hinged to the other panels at 12 and supports a transparent canopy or bubble 14 affording visibility for the driver. Panel 10 swings to either side of the vehicle about hinges 12 for ingress or egress.

Referring now to Figures 2 through 6 of the drawings, the cockpit is formed of rigid shells 16, 18, and 20 of plastic and glass cloth laminate. Shell 16 has a rear portion 22 contoured to the body of the driver to support him in a semi-reclining position, flanges 23 extending forwardly from either side of the contoured portion, Figure 2, and a head rest portion 24 extending upwardly from the contoured portion to support the head of the driver. The sides of shell 16 extend forwardly and terminate in vertical oblique flanges 26, Figure 3, and horizontal flanges 27, Figures 3 and 6. The bottom of the shell is raised at 28 just forward of the contoured portion 22 to clear the vehicle battery and terminates in an open boxlike portion 29, with the upper edge of this portion indicated by dot-dash line 30.

Figure 2:
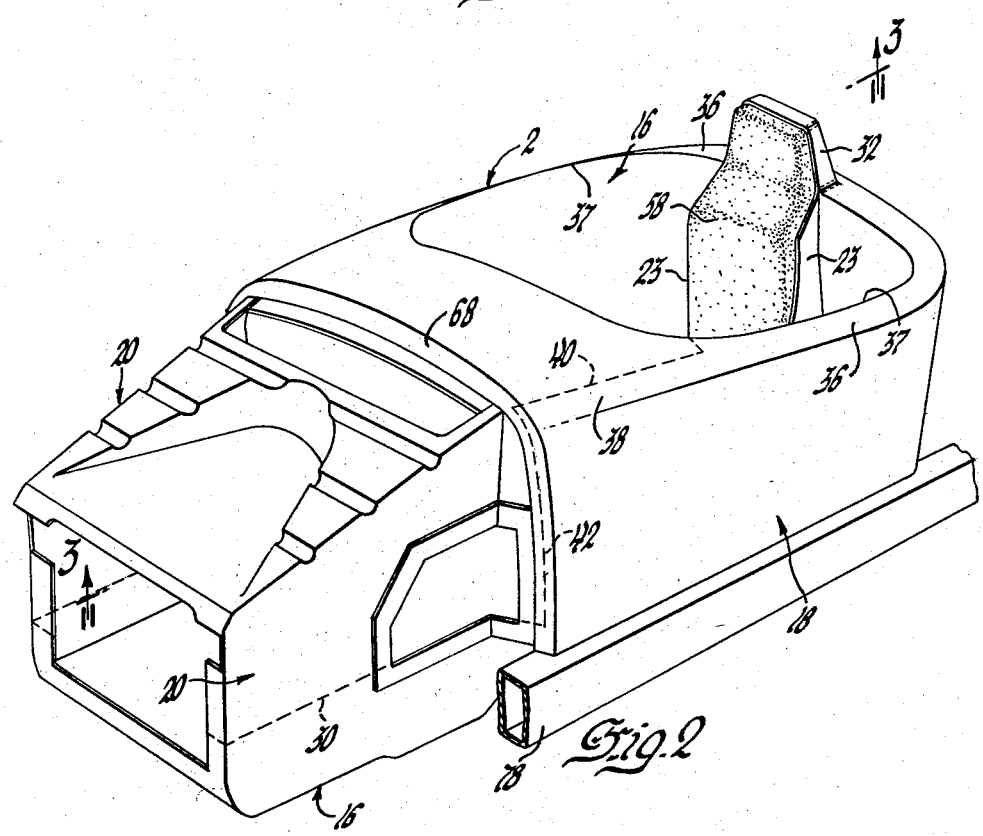
Figure 2 is a perspective view of the body shell or cockpit.

Shell 18 is spaced from shell 16 and has a flanged head rest portion 32 secured to head rest portion 24 of shell 16, strengthening ribs 34, Figure 3, of inverted V-shape to further reinforce the rear outer portion of the cockpit, and a flanged upper edge 36, Figures 2 and 4 secured at 37 to the upper edge of shell 16 and terminating in an arcuate flange portion 38, Figures 2 and 6, secured to the rear part of shell 20 and to flanges 27 of shell 16 along dash line 40. The forward edge of shell 18 is secured to shell 20 along dash line 42, Figure 2, and flanges 26 of shell 16 are secured to the inner surface of shell 18 at 44. The bottom edge of shell 18 includes flanges 46, Figure 6, secured to shell 16 at 48, and edge portion 50 indicated by dash lines in Figure 3 secured to shell 16. Flanges 46 are indicated by dash lines in Figure 3 and extend from point 52 to dash line 42. Thus, it can be seen that the rear and a portion of the sides and bottom of the cockpit are of double wall construction, and the chamber so formed is filled with cast-in-place rigid phenolic foam 54 to further stiffen the cockpit, particularly in the portion of the cockpit enclosing the body of the driver.

Referring now particularly to Figures 3 and 4, a layer 56 of foam rubber is bonded to the contoured portion 22 and the head rest portion 24 of shell 16 and extends between flanges 23, Figure 2. A covering 58 of wear resistant material is provided over the layer of rubber and secured thereto. It should be noted that the contoured portion 22 includes arcuate portions 59, 60, and 61 covered with the layer of foam rubber 56 to support the neck, shoulders, and lower back, respectively, of the driver.

A channel 64, Figures 3 and 5, is formed in the upper surface of shell 20 and extends downwardly along the sides of the cockpit, with portions of shell 16 and shell 18 adjacent dash line 42 being dished to continue the channel to dot-dash line 30. A forward roll-over bar 66 is secured to the channel and a strip 68 of plastic and glass cloth laminate secured to shells 18 and 20 covers the bar. The bar reinforces the forward portion of the cockpit and provides additional protection to the driver or operator should the vehicle overturn. The head rest portion of the cockpit formed by portions 24 and 32 of shells 16 and 18, respectively, and strengthening ribs 34 may be called the rear roll-over bulkhead and will further protect the driver should be vehicle overturn.

As hereinbefore stated, the cockpit is mounted directly on the vehicle chassis frame. Referring now particularly to Figure 3, shell 18 has a shoulder 70 resting on cross the frame member 72 of the chassis frame. Spaced metal tabs 74 extend downwardly from the edge of shoulder 70 and are bolted to frame member 72 at 76 to mount the rear of the cockpit on the chassis frame. Shoulder 70 extends forwardly around either side of the cockpit and rests on frame members 78, Figures 2 and 4, extending longitudinally of the vehicle and spaced by frame member 72. Shoulder 70 terminates at 52, Figure 3, and flanges 46 of shell 18 continue the shoulder to its termination just forwardly of the forward roll-over bar 66 as can be seen in Figures 2 and 5. Plates 80 are welded to the ends of the forward roll-over bar 66 and reinforcing webs 82 extend between the bar and the plates. The plates are bonded to the inner surface of flanges 46 and the resulting structure is bolted to frame members 78 at 84 to further mount the cockpit on the vehicle chassis. It will be noted that the cockpit extends between and below the frame members 78 to reduce the overall vehicle height and also add rigidity to the chassis.

The shells 16, 18, and 20 are secured together by cements suitable for plastic and glass cloth laminates or may be secured together by suitable mechanical fasteners.

Thus, this invention provides a cockpit for a vehicle or the like of exceedingly strong construction and very light weight. The driver or operator of the vehicle is afforded maximum visibility and protection and the rigidity and strength of the cockpit further strengthens the chassis frame.

Although a specific embodiment of this invention has been shown and described, various changes and modifications may be made within the scope and spirit of the invention.

We claim:

1. A vehicle body shell comprising, a first unitary shell having side walls, a bottom, and a rear wall, a second unitary shell having side walls, a bottom, and a rear wall, respective walls and bottoms of said first and second shells being secured together to locate said shells in spaced relationship and define a chamber therebetween, reinforcing means substantially filling said chamber and being secured to each of said shells to provide an intermediate substantially rigid wall for said body shell, said side and rear walls being generally coextensive in height to define a passenger compartment for receiving and substantially enclosing the body of an occupant, and a top wall extending between and joined to said side walls forwardly of said rear walls, said top wall and said side and rear walls defining the opening to said passenger compartment.

2. A vehicle body shell comprising, a first unitary shell of plastic and glass cloth laminate having side walls, a bottom, and a rear wall, a second unitary shell of plastic and glass cloth laminate having side walls, a bottom, and a rear wall, respective walls and bottoms of said first and second shells being secured together to locate said shells in spaced relationship and define a closed chamber therebetween, reinforcing means substantially filling said chamber and being bonded to each of said shells to provide an intermediate substantially rigid wall for said body shell, said side and rear walls being generally coextensive in weight to define a passenger compartment for receiving and substantially enclosing the body of an occupant, and a top wall of plastic and glass cloth laminate extending between and joined to said side walls forwardly of said rear walls, said top wall and said side and rear walls defining the opening to said passenger compartment.

3. The combination comprising a vehicle chassis frame including spaced side frame members, a rigid vehicle body shell having side walls joined by a bottom and a rear wall for substantially enclosing and forming the sole supporting means for the body of an occupant, means on said side walls of said body shell for supporting said body shell on said side frame members with the bottom of said body shell being located between said side frame members, and an outer vehicle body supported by said chassis frame and enclosing said body shell.

4. The combination comprising a vehicle chassis frame including spaced side frame members, a rigid vehicle body shell including a first unitary shell having side walls, a bottom, and a rear wall, a second unitary shell having side walls, a bottom, and a rear wall, respective walls and bottoms of said first and second shells being secured together to locate said shells in spaced relationship and define a chamber therebetween, reinforcing means substantially filling said chamber and being secured to each of said shells to provide an intermediate substantially rigid wall for said body shell, mounting means formed integrally with said side walls of said second shell and adapted to be secured to said spaced side frame members to mount said body shell on said members with the bottom of said body shell located between said side frame members, and an outer vehicle body supported by said chassis frame and enclosing said body shell, said outer vehicle body including panels movable to allow ingress and egress of the occupant.

References Cited in the file of this patent

UNITED STATES PATENTS

| | | |
|---|---|---|
| 1,027,764 | Rilleau | May 28, 1912 |
| 2,128,686 | Andreau | Aug. 30, 1938 |
| 2,263,365 | Nicolaus et al. | Nov. 18, 1941 |
| 2,488,978 | Julien et al. | Nov. 22, 1949 |
| 2,612,964 | Hobbs | Oct. 7, 1952 |
| 2,637,592 | Karlby | May 5, 1953 |
| 2,728,702 | Simon et al. | Dec. 27, 1955 |
| 2,744,042 | Pace | May 1, 1956 |

FOREIGN PATENTS

| | | |
|---|---|---|
| 151,161 | Austria | Oct. 25, 1937 |
| 913,737 | Germany | June 18, 1954 |

OTHER REFERENCES

Publication: "Fiberglas Auto Body Construction" by Wills, 1953, received Sept. 3, 1954, page 9.

UNITED STATES PATENT OFFICE

CERTIFICATE OF CORRECTION

Patent No. 2,876,037                                                  March 3, 1959

Anthony J. Ingolia et al.

It is hereby certified that error appears in the printed specification of the above numbered patent requiring correction and that the said Letters Patent should read as corrected below.

Column 3, line 16, for "should be" read -- should the --; line 20, strike out "the", first occurrence"; column 4, line 14, for "weight" read -- height --.

Signed and sealed this 11th day of August 1959.

(SEAL)
Attest:

KARL H. AXLINE                                                 ROBERT C. WATSON
Attesting Officer                                             Commissioner of Patents